Figure 1:
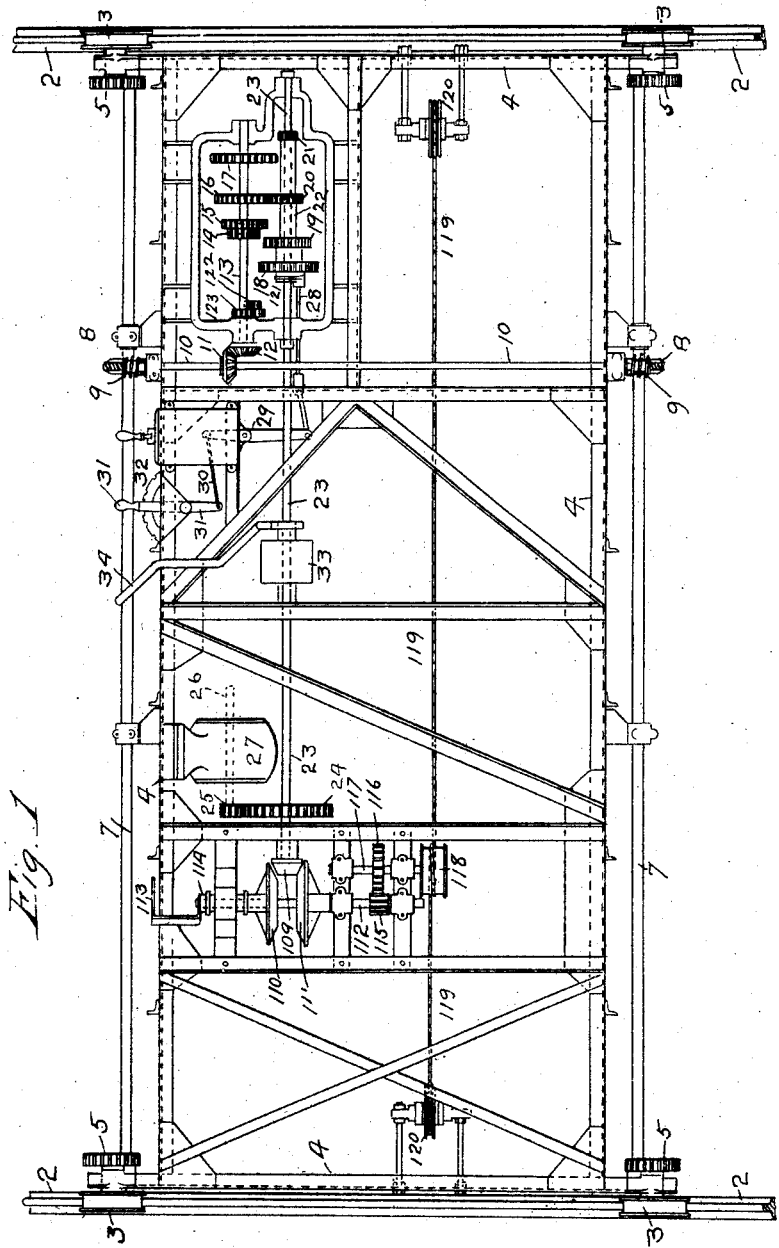

No. 882,738. PATENTED MAR. 24, 1908.
H. W. BLAISDELL.
FILTER MACHINE.
APPLICATION FILED JUNE 24, 1905.

5 SHEETS—SHEET 1.

Witnesses
Harry A. Brooks
E. Freeman Mould

Inventor
Hiram Wheeler Blaisdell

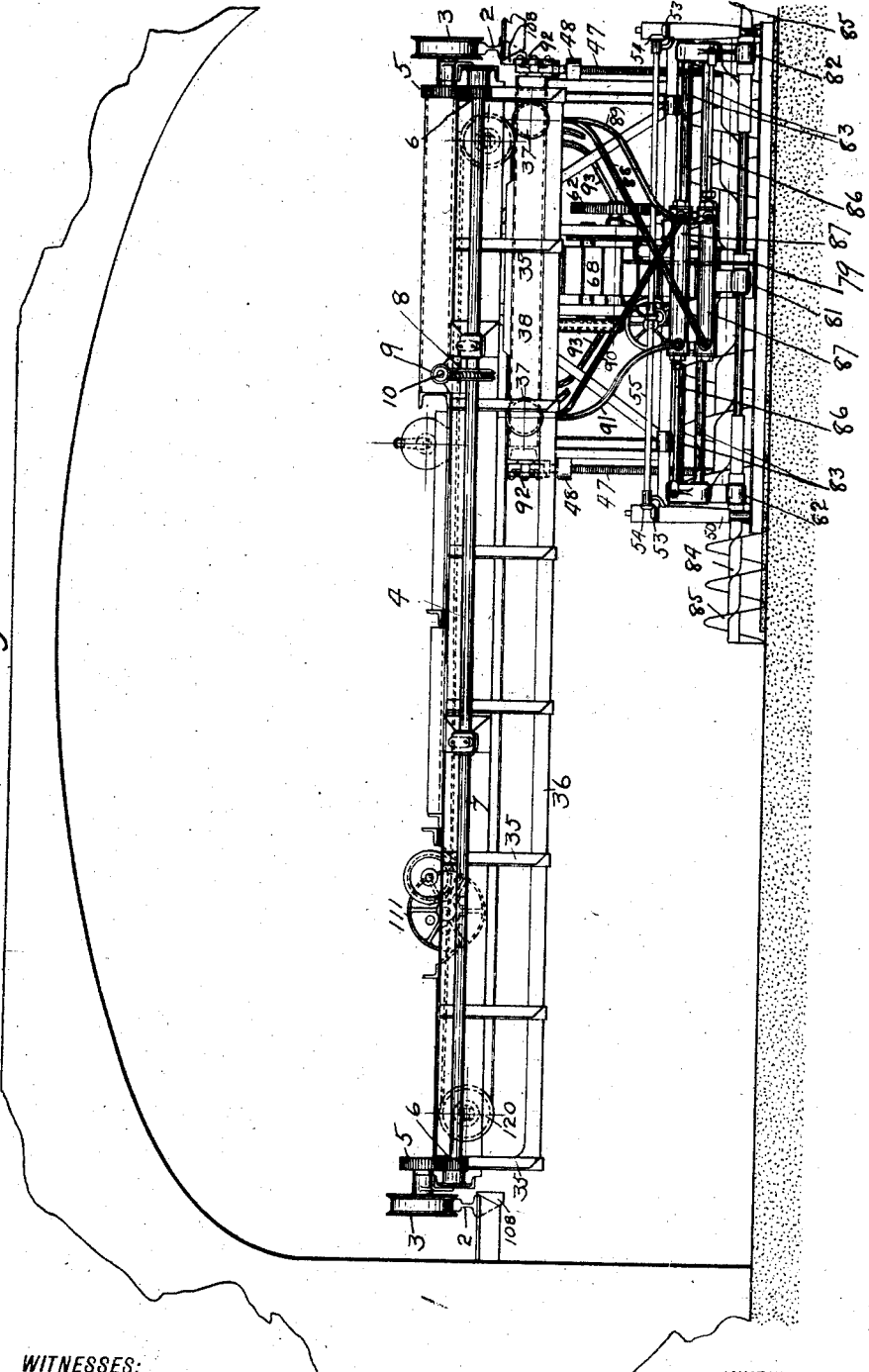

No. 882,738. PATENTED MAR. 24, 1908.
H. W. BLAISDELL.
FILTER MACHINE.
APPLICATION FILED JUNE 24, 1905.
5 SHEETS—SHEET 3.
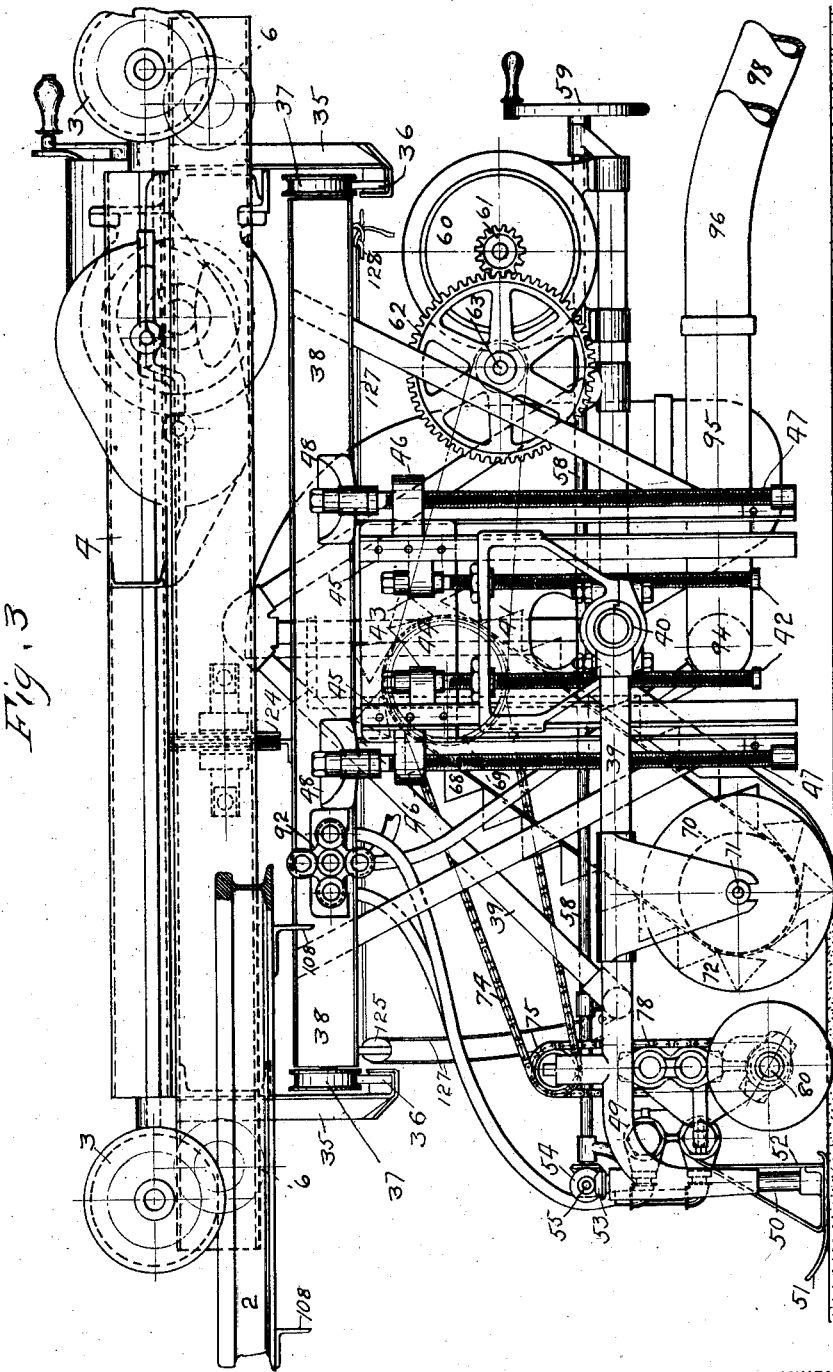
WITNESSES:
INVENTOR

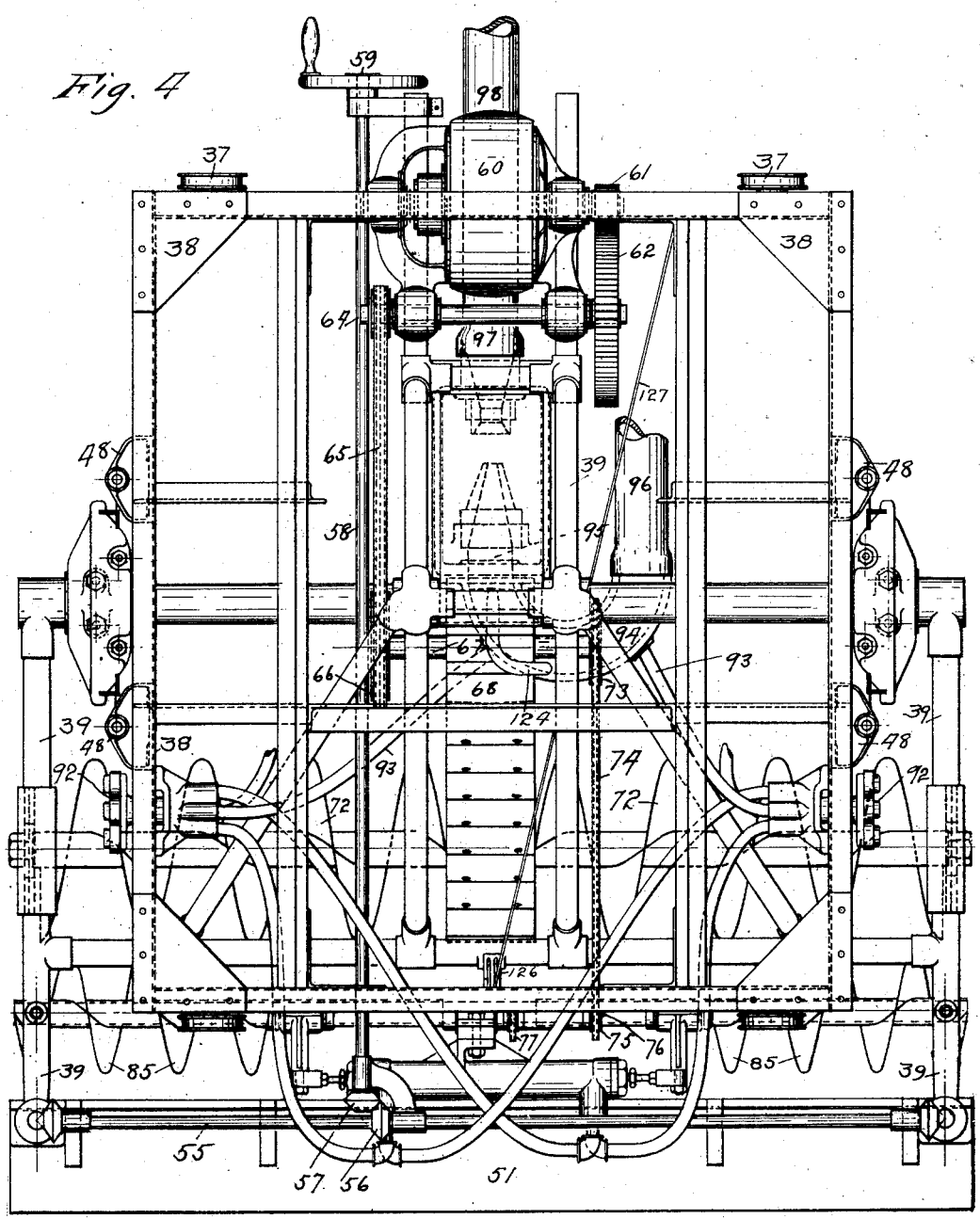

No. 882,738. PATENTED MAR. 24, 1908.
H. W. BLAISDELL.
FILTER MACHINE.
APPLICATION FILED JUNE 24, 1905.
5 SHEETS—SHEET 5.
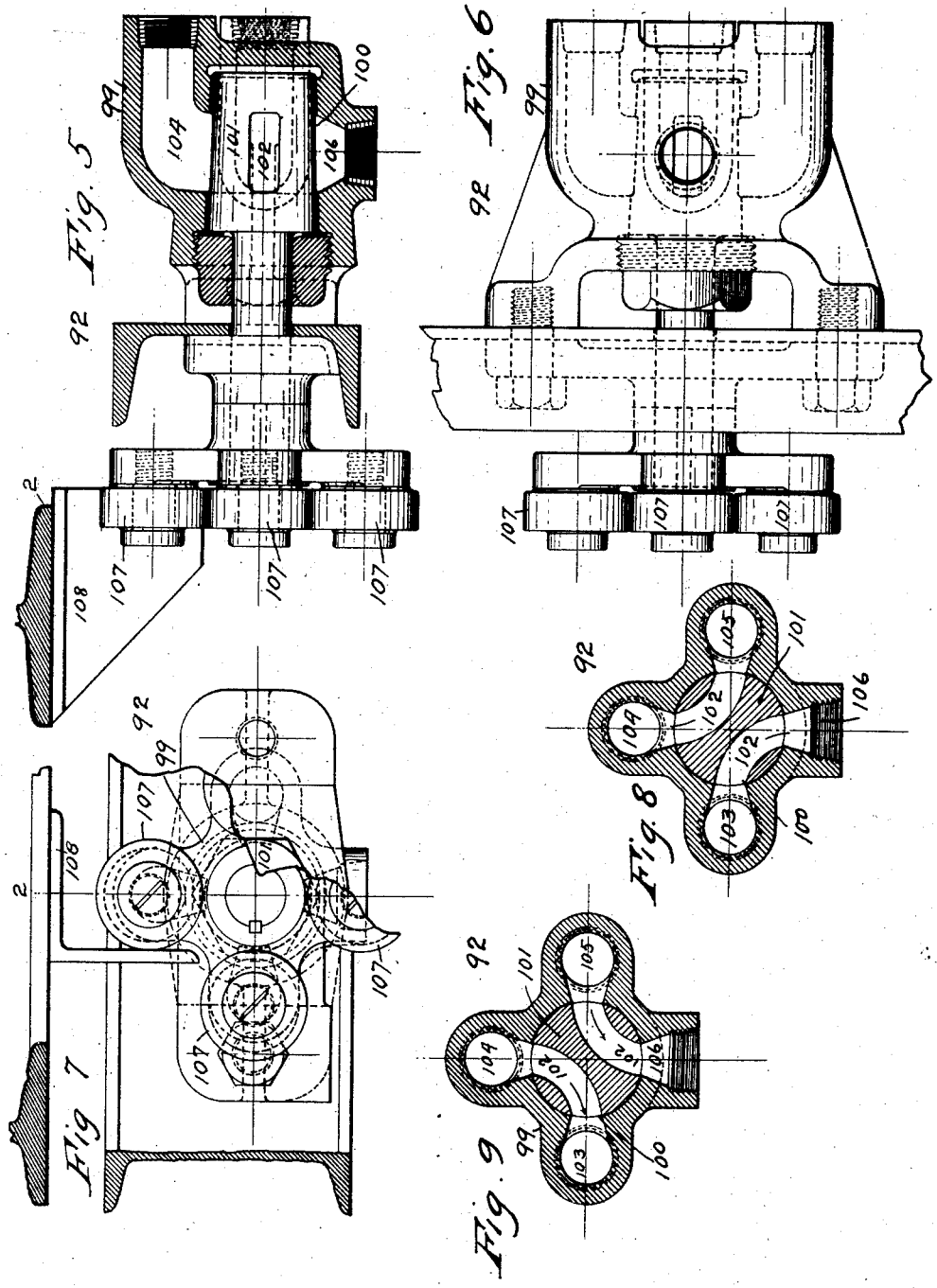
WITNESSES:
INVENTOR

UNITED STATES PATENT OFFICE.

HIRAM WHEELER BLAISDELL, OF LOS ANGELES, CALIFORNIA.

FILTER-MACHINE.

No. 882,738.  Specification of Letters Patent.  Patented March 24, 1908.

Application filed June 24, 1905. Serial No. 266,867.

*To all whom it may concern:*

Be it known that I, HIRAM WHEELER BLAISDELL, a citizen of the United States, residing at Los Angeles, in the county of Los Angeles and State of California, have invented certain new and useful Improvements in Filter-Machines; and I do hereby declare the following to be a full, clear, and exact description of the invention, such as will enable others skilled in the art to which it appertains to make and use the same.

This invention relates to machines for operating upon covered or obstructed filtration plants, or filterbeds, and particularly to machines for removing the surface portion of sand filters.

One of the objects of the invention is to provide a machine constructed to travel longitudinally and transversely of the filter-bed without effecting injurious or detrimental pressure thereon.

A further object of the invention is to provide means for regulating the position of the operative parts of the machine in relation to the surface of the filter-bed.

Still another object of the invention is to provide a counter-poise for the weight of the operative parts of the machine.

It is also an object of the invention to provide supporting means constructed to travel longitudinally of the filter-bed, upon which the operative parts of the machine are adapted to travel transversely of the filter-bed.

Another object of this invention is to provide a support, constructed to travel longitudinally of the filter-bed, whereon the operative parts of the machine are constructed to travel transversely of the filter-bed, flexible connections with the source of water supply and discharge, and means for removing the material taken from the filter-bed.

Furthermore an object of the invention is to provide automatic means for extending and retracting the auxiliary conveyers in order that the machine can operate around or adjacent to the piers, columns, or other obstructions of a closed filter.

Another object of the invention is to provide means for adjusting the runner or shoe in relation to the surface of a filter-bed.

With these, and other, objects in view the invention consists essentially in the construction, combination and arrangement of parts substantially as more fully described in the following specification, and as illustrated in the accompanying drawings, forming part of this application, in which Figure 1 is a top plan view of the traveling supporting structure, showing a portion of the support whereon said structure is constructed to travel; Fig. 2 is a front elevational view of the entire machine in operative position upon a filter-bed, showing the auxiliary conveyers in extended position; Fig. 3 is an enlarged, side elevational view of the machine; Fig. 4 is a top plan view of the movable frame and the operative parts of the machine; and Figs. 5, 6, 7, 8 and 9 are detail views of the 4-way valves in the device for extending and retracting the auxiliary conveyers.

Whenever the yield of filtration works or slow sand filter-beds is diminished to such a degree that a sufficient quantity of water cannot be obtained therefrom, by reason of the clogging of the surface of the filter, it then becomes necessary to scrape the filter-bed, or to remove the upper portion of the same.

This invention is particularly designed and constructed for use upon filtration works or filter-beds which are partially or entirely closed or roofed over, and which are constructed with obstructions, such as columns, piers or buttresses, by reason of which machinery capable of use upon open or uncovered filter-beds, cannot be employed, and wherein the transporting or treating of the filtering material is usually required to be done by manual labor.

Although this invention relates particularly to use upon closed or covered filtration works or filter-beds, and is so shown and described herein, yet it will be understood that the same is not confined or limited thereto; and that the application of this invention thereto is only typical of one of the many uses of which the same is capable.

Covered filters are generally constructed with a roof or covering of the groined arch type supported by piers or columns, which, passing through the filtering material, interrupt the surface of the filter, thereby rendering much more difficult the operation of cleaning, scraping or treating the filtering material; therefore this invention will be described in connection with such a closed filter, wherein the filter-beds are arranged in a plurality of parallel rows or galleries, or the rows of supporting columns or piers form the rows of filter-beds or galleries.

Referring particularly to Figs. 1 and 2 of the drawings, the reference character 1 designates the supporting columns or piers, of a covered or closed filtration works, with which are connected or on which are formed supporting ways or tracks 2, whereon are adapted to travel wheels or rollers 3, on which is mounted a traveling structure or bridge 4, of any preferred form and construction; and upon one end of the axle's carrying wheels 3 are secured gear wheels 5, meshing with pinions 6 on propelling shafts 7, each carrying a worm wheel 8, meshing with worms 9 on a worm shaft 10, whereon is secured a beveled pinion 11, engaging a similar pinion 12, on a counter shaft 13, whereon are keyed gears 14, 15, 16 and 17, Fig. 1, adapted to respectively engage gears 18, 19, 20 and 21, on a sliding sleeve 22, splined on an operating shaft 23, carrying a large gear wheel 24, meshing with a pinion 25, on the drive shaft 26, of an electric motor 27, or other actuating apparatus, having suitable electrical connections, as shown in Fig. 1 of the drawings.

A pull rod 28 is connected with the sliding sleeve 22 and has suitable connections with an interpivoted lever 29, the opposite end whereof is connected, by a link 30, with a throwing lever 31, provided with a locking quadrant 32, by means of which the position of the sliding sleeve 22 and the engagement of the gears carried thereby, can be regulated by the operator.

The operating shaft 23 is formed in two parts or sections, and is provided with a clutch 33, operated by a clutch lever 34, whereby the shaft may be disconnected to permit the sleeve to be moved thereon for the purpose of effecting the engagement of the desired gears on said sleeve with the gears on the counter shaft 13, while that section of the operating shaft is idle as will be readily understood.

By means of the construction just described the machine may be made to travel at varying speeds; rates intermediate between those furnished by the gears being obtained by changing the speed of the motor, as for instance, by introducing a resistance into the fields thereof. The travel of the machine may be reversed by reversing the rotation of the motor.

Formed on, or connected with, the traveling supporting structure or movable bridge 4, by means of hangers 35, are longitudinal ways or tracks 36, Figs. 2 and 3, constructed to receive the supporting wheels 37 of a traveling frame or movable platform 38, of any desired construction, to which the operative mechanism of the machine is connected, or from which the latter may be suspended, as illustrated in Figs. 2, 3 and 4 of the drawings.

The operative portion of the machine embodies a tubular frame or member 39, pivotally or movably mounted at one end in bearings 40, formed in, or connected with, hangers or castings 41, Figs. 3 and 4, adjustably supported by the screws 42, depending from lugs 43, formed on, or connected with, a plate or member 44, having depending angle irons or guides 45, whereon said castings 41 travel; and the member 44 is provided with threaded lugs 46, to receive threaded rods 47, secured in extensions or hangers 48, formed on the traveling frame 38; whereby the position of the operative parts of the machine can be readily and accurately adjusted in relation to the surface of the filter-bed, or the cut can be regulated. By this means of suspension, the weight of the forward part of the machine is balanced by the portion to the rear of the tubular bearing or fulcrum, thereby preventing the former from exerting undesirable pressure on the filter-bed and allowing the cutting apparatus to follow any slight inequalities in the surface on which it operates.

The forward ends or corners of the frame 39 are bent laterally or deflected, as at 49, and are made hollow to slidably receive the tubular extensions or guides 50, of a traveling shoe or runner 51, constructed with brace or shield 52, Figs. 2 and 3; and bevel pinions 53 are secured to screws within the guides 50 and mesh with similar pinions 54, on a horizontal shaft 55, carrying an intermediate bevel pinion 56, engaging a like pinion 57, on an operating rod 58, having a hand wheel or other device 59, by means of which the shoe or runner can be raised or lowered to elevate or depress the forward or free end of the tubular frame 39, on its pivot. A motor 60 is mounted upon the rear portion of the tubular frame 39. Its armature shaft carries a pinion 61, meshing with a gear 62 on a shaft 63; shaft 63 has on its other end a sprocket wheel 64 connected by a chain 65 with a sprocket 66 on the shaft 67 of the elevator 68. On shaft 67 is rigidly mounted a pulley 69. The lower end of elevator 68 runs over a pulley 70 mounted on a shaft 71, the extremities of which have rigidly mounted thereon main conveyer flights 72. On the end of elevator shaft 67 remote from sprocket 66 is affixed sprocket 73 connected by a chain 74 with a sprocket 75 on a countershaft 76 which also carries sprocket 77 connected by a chain 78 to a sprocket 79 on a shaft 80 journaled in hanger 81. Hangers 82 slidably mounted on rods 83 have journaled in them sleeves 84, carrying right and left hand extensible auxiliary conveyer flights 85. Hangers 82 are connected by piston rods 86 with pistons in cylinders 87 here shown as hydraulic cylinders having inlet and outlet connections 88

89, 90 and 91 with 4-way valves 92 each having a flexible connection 93 with the inlet portion 94 of an ejector 95. The portion 94 of the ejector 95 is provided with a flexible connection 96, with the source of fluid supply, water under pressure preferably; and the discharge or outlet portion 97 of the ejector 95, is provided with a flexible connection 98 for the conveyance of the foul filtering and other material to the desired place of discharge.

The 4-way valves 92 are similar in construction and operation, and it will only be necessary to specifically describe one of them, which consists of an outer member or casing 99, Figs. 5 to 9, constructed with a central bore 100, adapted to receive a valve 101, having transverse passages 102, constructed to be alternately brought into registering position with the longitudinal circumferential ports 103, 104, 105, and the exhaust port 106, of said outer member 99, when one of the rollers 107 connected with said valve is brought into contact with a tripper or bracket 108, upon the rail 2, as shown in Fig. 7 of the drawings.

The inlet flexible connection 88, Figs. 2, 3 and 4, is connected with the closed end of the lower cylinder 87 and with the port 102, of the outer member 99, and the flexible connection 89 is attached to the lower cylinder, near the outward end thereof, and with the other port 105, while the port 104 of said outer member 99 is provided with flexible connection 93 with the inlet portion 94 of the ejector 95, and the exhaust port 106 of said member 99 is supplied with a suitable pipe or hose of any desired length.

On the end of shaft 23 remote from the clutch 33 is affixed a bevel friction pinion 109, adapted to engage bevel friction wheels 110 and 111 on a shaft 112, which is adapted to be moved longitudinally in its bearings by means of a lever 113, which operates the sleeve 114, provided with threads of coarse pitch, which engages an internal thread in the bearing 114. Shaft 112 carries a pinion 115, which meshes with a gear 116, carried on a shaft 117 on the forward end of which is mounted a drum 118, over which travels a rope 119, passing over pulleys 120, carried by the frame 4. The ends of rope 119 are attached to the frame 38 in any convenient manner. An idler gear 122 is mounted on a stud in the case inclosing the speed change gears and meshing with a gear 123, on shaft 13. A pipe 124 is provided to throw a stream of water into the hood or hopper inclosing elevator 68. At the forward end of frame 38 a pulley block 125 is suspended, through which, and another block (not shown) fastened to the front part of frame 39, a rope 127 passes, the end of which is secured to a cleat 128, at the rear of frame 38.

The method of operation of this filter cleaner is as follows: The apparatus being at one end of a filter gallery, is lowered by adjusting screws 42 or 47, until it is at a proper elevation, relative to the surface of the filter to effectually operate the same. The motor 27 is started, the lever 31 being operated to throw the sliding sleeve 28 into position to bring such gears into engagement as will propel the machine at the requisite speed. The actuating fluid is allowed to flow through the flexible connection 96, to the ejector 95. The motor 60 is then started, which, through the mechanism previously described, imparts motion to the main and auxiliary conveyer flights and the elevator 68. The clutch 33 is then thrown into engagement, by which the power of the motor is transmitted to the wheels 3 and the machine is propelled longitudinally of the gallery, whereupon the conveyer flights cut and convey to the elevator a layer of the surface of the filterbed, which is delivered by the elevator 68 to the ejector 94, being aided by a stream of water delivered by pipe 124, and conveyed through the pipe 98 to the predetermined point of discharge. When the auxiliary conveyer flight 85 approaches an obstruction in the filter, one of the trippers 108 which is placed in the proper position for this purpose, comes in contact with one of the rollers 107, thereby turning the 4-way valve to a position to admit the actuating fluid to the outer end of the cylinder 87, thereby retracting the conveyer flight and retaining it in this position until the obstruction is passed and the succeeding roller 107 comes in contact with a tripper and turns the 4-way valve to a position admitting the fluid to the inner end of the cylinder 87 and re-extending the flight. When the end of the gallery is reached the cutting mechanism may be elevated by tilting on the axis 40 by means of a rope 127, as will be readily understood, and the lever 31 operated to bring gear 18 into engagement with an intermediate gear 121, whereby the machine is driven in a reverse direction at its maximum speed. When the starting point is reached, clutch 33 is disengaged and lever 113 operated to rotate shaft 112, shaft 117 and drum 118, by which means the cutting apparatus is moved transversely of the supporting frame 4, and by means of rope 127 is lowered to a position to operate upon the remaining half of the gallery.

Applicant has set forth in the foregoing description of his apparatus a combination of elements, each of which he considers the best form for the purpose intended, but applicant does not desire to limit his invention to the particular devices herein shown and described, and, he reserves the right to use such mechanical equivalents of any of the elements as may seem to him desirable and to make such modifications in the same as do not depart from the spirit and scope of his invention.

Claims

1. A filter machine provided with a conduit having a plurality of passages, a valve in said conduit having a plurality of ports, cylinders in connection with said valve, inlet and outlet connections for said cylinders and a conveyer connected with the pistons of said cylinders, whereby said conveyers can be retracted and extended by the operation of said valve.

2. A filter machine, a stationary structure on which said machine is adapted to travel, auxiliary conveyers mounted in said machine, means for automatically extending and retracting said conveyers and means mounted on said stationary structure for causing the actuation of said extending and retracting means.

3. In a filter cleaning apparatus, a frame, mechanism for operating upon the surface of the filter pivotally supported in said frame and a counter poise to assist said mechanism in turning about said pivotal point.

4. In a filter cleaning apparatus, a frame and mechanism for operating upon the surface of the filter pivotally supported in said frame in such manner that the weight thereof is distributed to assist said mechanism in turning about said pivotal point.

5. In a filter cleaning apparatus, a frame, mechanism for operating upon the surface of the filter pivotally mounted in said frame, an adjustable shoe carried by said frame and means for raising and lowering said shoe to elevate or depress said frame.

6. In a filter cleaning apparatus, main and auxiliary conveyers and means for extending and retracting the auxiliary conveyers comprising an hydraulic cylinder, a valve controlling the same and means for actuating said valve at predetermined intervals.

7. In a filter cleaning apparatus, a support, mechanism for operating upon the surface of the filter adapted to travel on said support, extensible and retractible conveyers in connection with said mechanism, an hydraulic cylinder for extending and retracting said conveyers, a valve controlling said cylinder and means on the support for actuating said valve at predetermined intervals.

8. In a filter cleaning apparatus extensible and retractible members, an hydraulic cylinder for extending and retracting said members, a valve controlling said cylinder, a tripper and means on said valve adapted to contact with said tripper to open and close said valve.

9. In a filter cleaning apparatus, tracks, a carriage to run on said tracks, mechanism for operating upon the surface of the filter supported on said carriage, extensible and retractible members in connection with said mechanism, valve controlled means for ectending and retracting said members and means for actuating said valve controlled means.

10. In a filter cleaning apparatus, a main frame, an auxiliary frame supported thereby and means for raising and lowering said auxiliary frame with relation to said main frame comprising screws in said auxiliary frame carrying lugs engaging screws supported from the main frame.

11. In a filter cleaning apparatus a main frame and an auxiliary frame, said auxiliary frame being vertically adjustable with relation to the main frame by means comprising a bearing on which said auxiliary frame is pivotally supported, hangers on said bearing screws in said hangers, lugs on said screws and a second series of screws supported by the main frame adapted to coöperate with said lugs.

12. A filter machine comprising a traveling structure, a frame movably mounted thereon, main and auxiliary conveyers mounted in said frame, an elevator, a receiver for the material raised by the elevator, an ejector communicating with said receiver, an adjustable shoe on said frame to regulate the depth of cut of the conveyers, an hydraulic cylinder for extending and retracting the auxiliary conveyers, a valve controlling said cylinder and means carried by said traveling structure to actuate said valve.

In testimony whereof, I have signed my name to this specification, in the presence of two subscribing witnesses at Los Angeles, in the county of Los Angeles, State of California, this 15th day of June, A. D. 1905.

HIRAM WHEELER BLAISDELL.

Witnesses:
HARRY A. BROOKS,
E. FREEMAN MOULD.